United States Patent [19]

Dunham

[11] Patent Number: 4,905,664
[45] Date of Patent: Mar. 6, 1990

[54] COMBINATION GRILL AND DEEP FRYER

[76] Inventor: Jimmie W. Dunham, 9148 S. Blackwater Rd., Baton Rouge, La. 70818

[21] Appl. No.: 261,258

[22] Filed: Oct. 24, 1988

[51] Int. Cl.⁴ .............................................. F24D 1/00
[52] U.S. Cl. ..................................... 126/391; 99/340; 99/403; 126/41 R
[58] Field of Search ..................... 126/369.1, 391, 367, 126/366, 368, 41 R; 99/403, 410, 415, 418, 416, 446, 444, 340; 165/177

[56] References Cited

U.S. PATENT DOCUMENTS

| | | | |
|---|---|---|---|
| 265,391 | 10/1882 | Cottingham | 99/444 |
| 1,294,159 | 2/1919 | Potts | 99/446 |
| 1,922,838 | 8/1933 | Bossart | 165/177 |
| 2,543,835 | 3/1951 | Dewey | 126/391 |
| 2,712,308 | 7/1955 | Keating | 126/391 |
| 2,723,617 | 11/1955 | Dreyfus | 99/444 |
| 2,756,321 | 7/1956 | Pappas | 126/391 |
| 2,898,846 | 8/1959 | Del Francia | 99/443 |
| 3,320,873 | 5/1967 | Nissen | 99/423 |
| 3,448,678 | 6/1969 | Burstein | 99/386 |
| 3,472,156 | 10/1969 | Bardeau | 99/423 |
| 3,640,208 | 2/1972 | Size | 99/403 |
| 3,763,846 | 10/1973 | Schantz | 126/41 R |
| 4,209,006 | 6/1980 | Marsalko | 126/25 R |
| 4,442,824 | 4/1984 | Amici | 126/14 |
| 4,478,205 | 10/1984 | Koziol | 126/25 R |
| 4,580,549 | 4/1986 | Sato | 126/391 |

Primary Examiner—James C. Yeung
Attorney, Agent, or Firm—Timothy J. Monahan; William D. Kiesel; Robert C. Tucker

[57] ABSTRACT

A combination grill and deep fryer is provided having a plurality of horizontal, parallel tubes with an intake manifold at one end and an exhaust manifold at an opposite end. Combustion gases are delivered to the tubes via the intake manifold and drawn through the tubes by an exhaust fan. Food may be grilled on the heated tubes or the tubes may be submersed in a pan containing a liquid cooking medium such as water or cooking oil.

4 Claims, 4 Drawing Sheets

COMBINATION GRILL AND DEEP FRYER

BACKGROUND OF THE INVENTION

1. Field of the Invention

This invention relates generally to gas fired cooking apparatus and particularly to a portable, outdoor cooking apparatus in which combustion gases are drawn through a plurality of tubes arranged to create a horizontal surface. Food can be grilled on the heated tubes or the tubes can be submersed in water or oil to create a boiler or deep fryer respectively.

2. Prior Art

The use of electrically heated tubes to grill food is known in the prior art. In Nissen et al., U.S. Pat. No. 3,320,873 and Bardeau et al., U.S. Pat. No. 3,472,156 the electrically heated tubes provide a cooking surface particularly suited for frankfurters. Burstein, U.S. Pat. No. 3,448,678 discloses the use of radiant heat from electrically heated tubes to cook. The heated tubes shown in the aforementioned patents are not designed to be immersed. Another shortcoming of electrical heating elements is that they are slower to heat up and respond to adjustments than gas fired cooking equipment.

Gas has been commonly used as a heat source for cooking. Food may be fried, boiled or fried by supporting a particular cooking vessel above a gas burner. Gas grills employ a bed of rocks or briquets positioned above a burner which radiate heat to the food suspended on a rack above. Gas broilers have also been employed with limited success. Examples of gas fired cooking equipment can be found in the following U.S. patents:

|            |           |
|------------|-----------|
| Cottingham | 265,391   |
| Dreyfus    | 2,723,617 |
| Francia    | 2,898,846 |
| Schantz    | 3,763,846 |
| Amici      | 4,442,824 |
| Koziol     | 4,478,205 |

Despite the myriad gas fired cooking apparatus in the prior art, it is believed that a more efficient, versatile cooking device is possible.

SUMMARY OF THE INVENTION

Therefore, one object of this invention is to provide a gas fired cooking apparatus with heated tubes for grilling food.

Another object of this invention is to provide a gas fired cooking apparatus with increased heat transfer efficiency.

Still another object of this invention is to provide a gas fired cooking apparatus with the versatility to boil and deep fry food as well as to grill it.

Accordingly, a gas fired cooking apparatus is provided comprising an intake manifold, a plurality of tubes each having an end connected to the intake manifold and an exhaust manifold. The tubes are arranged to define a horizontal planer surface. The lower end of the intake manifold is a duct for supplying a mixture of oxygen and gas to the intake ends of the tubes. The apparatus has a frame to support the tubes in an elevated position, and, in a preferred embodiment, the tubes may be immersed in a pan filled with a cooking fluid. The pan is slidable on the frame beneath the tubes and a jack raises and lowers the pan.

PREFERRED EMBODIMENT OF THE INVENTION

Without limiting the scope of the invention, the preferred embodiment of the invention is hereinafter described.

The cooking apparatus employs an array of horizontal tubes to transfer heat and support the food. The tubes are arranged to define a planer surface with an intake end for receiving burning gas and an exhaust end for discharging the reacted gases. Gas can be apportioned to the intake ends of the tubes by a variety of methods. For example, individual jets may be positioned at each tube or the intake of the tubes can be connected to a manifold with the gas dispersed therein. The term gas is meant to encompass flammable hydrocarbons, whether gaseous or liquid. Examples of fuels particularly suited for use with the apparatus are natural gas, propane and butane. As used herein, the term combustion gases includes a combustible mixture of fuel gas and oxygen, the mixture as it is burning and the reacted gases.

The cooking tubes are heated as the combustion gases flow through them. Preferably, a pressure differential is created in the tubes by a fan in communication with an intake manifold or an exhaust manifold. As discussed below, various methods to increase heat transfer by creating turbulent flow within the tubes may be adapted to the apparatus.

Once the tubes are heated, they provide a cooking surface for grilling food such as steaks and chicken. A flat tray can be placed beneath the tubes to catch the drippings. Alternatively, the tubes can be immersed in water or cooking oil to create a boiler or deep fryer. In a preferred embodiment, a pan containing the liquid cooking medium is positioned on a frame beneath the tubes. A hydraulic jack raises the pan to submerse the tubes therein. Of course in the aforementioned embodiment, suitable ducts must be provided at either end of the tubes to prevent liquid from entering the tubes or interfering with the gas burners.

Figure 1:
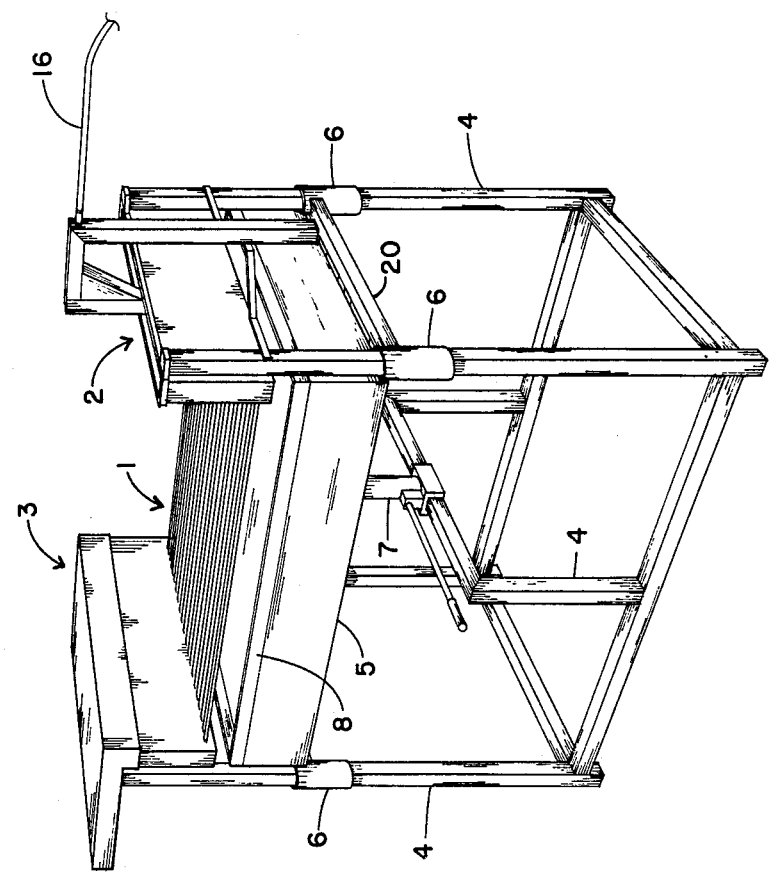
FIG. 1 is a perspective view of the cooking apparatus.

Referring to FIG. 1, tubes 1 are connected at one end to intake manifold 2 and at an opposite end to exhaust manifold 3. Tubes 1 are supported by frame 4 connected to each of the manifolds 2 and 3. Positioned beneath tubes 1 is cooking pan 5 which is supported on frame 4.

Cooking pan 5 may be filled with water, oil or other cooking medium. Cooking pan 5 is dimensioned to accommodate the lower end of intake manifold 2, tubes 1 and the lower end of exhaust manifold 3, when it is desired to boil or deep fry food. Sleeves 6 are connected to the corners of pan support 20 which is slidable on frame 4 and keeps cooking pan 5 stabilized on a plane parallel to tubes 1. Jack 7 is positioned on frame 4 below cooking pan 5 and is used to raise and lower pan support 20 and cooking pan 5. As discussed below, tubes 1 are heated by burning gas. When heated, tubes 1 are able to raise the liquid cooking medium in cooking pan 5 to a suitable temperature. Because tubes 1 are submersible in liquid, the seals between the intake end of tubes 1 and the lower end of intake manifold 2 and the exhaust ends of tubes 1 and the lower end of exhaust manifold 3, must be air tight. Additionally, the lower ends of intake manifolds 2 and exhaust manifold 3 must be kept free of any projections or supports, so that the ends may be submersed in cooking pan 5. Therefore, in the preferred embodiment only the upper portion of each manifold is connected to the frame to support tubes 1 in a raised position.

Figure 2:
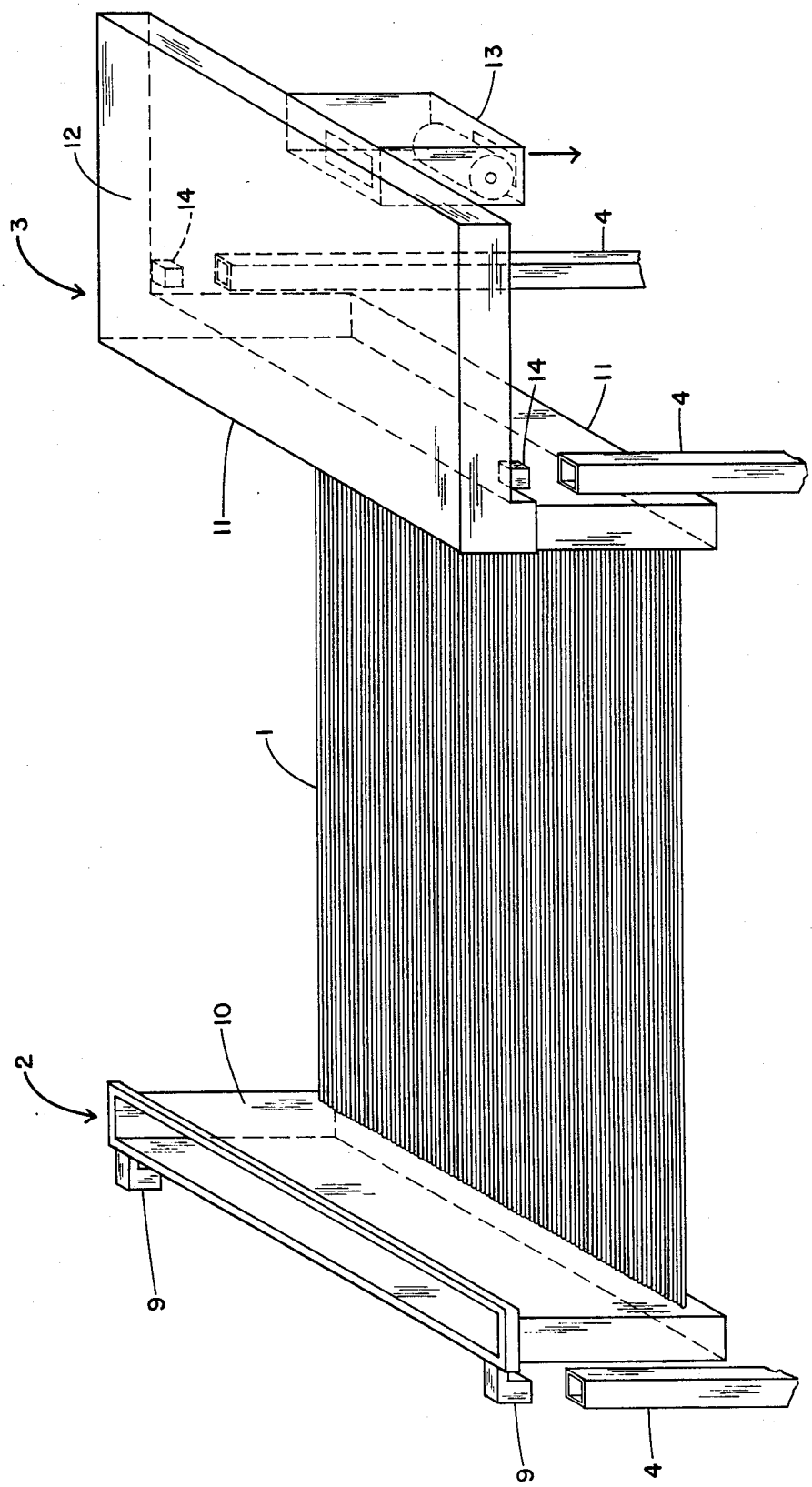
FIG. 2 is a perspective of the intake manifold, tubes and exhaust manifold and fan.

When grilling food on tubes 1, cooking pan 5 is lowered and drip pan 8 is inserted between cooking pan 5 and tubes 1. Drip pan 8 has a bottom designed to engage the upper lip of cooking pan 5. Various methods to engage the two pans may be adapted by those with skill in the art. Referring to FIG. 2, a detailed drawing of tubes 1, intake manifold 2, and exhaust manifold 3 is provided. Intake manifold 2 is made up of a vertical intake duct, the lower end of which is connected to an intake end of each of tubes 1. The upper end of intake manifold 2 is connected to frame 4 by horizontal supports 9. The distance between supports 9 and the lower end of intake manifold 2 must be sufficient to allow tubes 1 to be submersed in cooking pan 5 when desired. Furthermore, all portions of intake duct 10 which are to be submersed must be air tight. Tubes 1 are a plurality of parallel tubes arranged to form a horizontal plane. Exhaust manifold 3 is made up of vertical exhaust duct 11 connected at its lower end to the exhaust ends of tubes 1. The upper end of exhaust duct 11 is bent at a right angle away from tubes 1 to form a horizontal surface 12. Horizontal surface 12 is heated by the exhaust gases and may be used as a bread warmer. An exhaust fan 13 is positioned in exhaust duct 11 to draw burning gas through tubes 1. The discharge end of exhaust duct 11 is directed downward away from the operator. While not shown in the drawings, an alternate embodiment of the invention is to position a fan in intake duct 10, to force the burning gases through tubes 1 rather than drawing the burning gases from the exhaust duct end. Supports 14 connect exhaust duct 11 to frame 4. As with horizontal supports 9, supports 14 are positioned to allow the lower end of exhaust duct 11 to be submersed. In addition to serving as conduits for the combustion gases, intake duct 10 and exhaust duct 11 act as hangers, vertically suspended from frame 4, for maintaining tubes 1 in a raised position.

Figure 3:
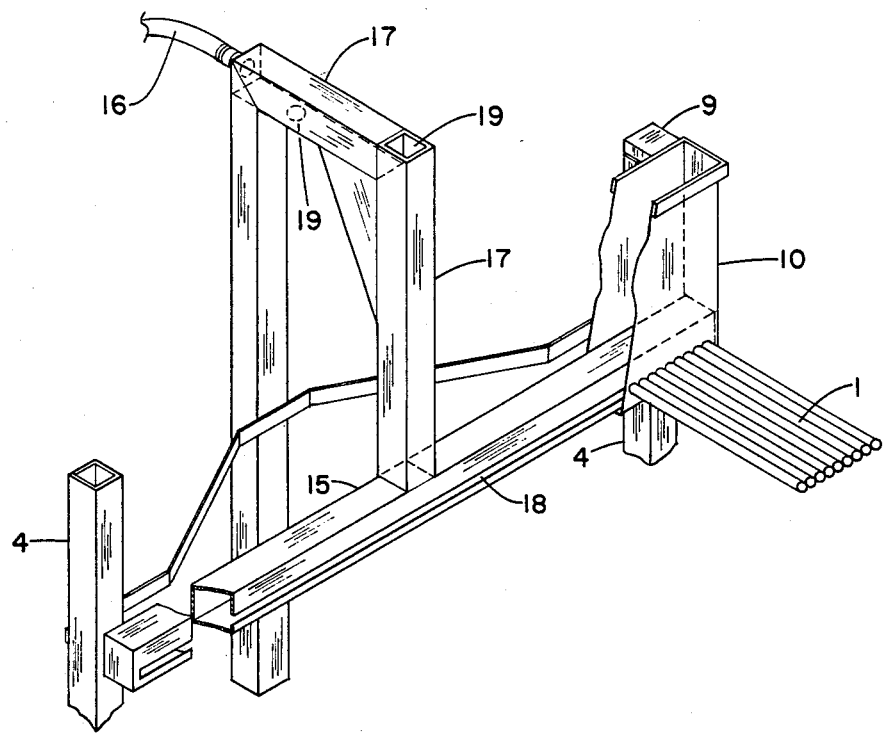
FIG. 3 is a perspective of the carburetor/fuel distributor.

FIG. 3 shows a method of directing a combustible gas and oxygen mixture to the intake ends of tubes 1. A gas dispersion head 15 is positioned in the lower end of intake duct 10. Gas flows from fuel source 16 through conduit 17 and out slot 18. Conduit 17 has openings 19 for air intake and to light the flame. Gas dispersion head 15 may be lifted out of intake duct 10 for adjustment, servicing or for easier transportation. In addition to the air drawn in through opening 19 and conduit 17, air is also drawn through the upper end of intake duct 10. Those with skill in the art may adapt various other means to supply a gas-oxygen mixture to the intake ends of tubes 1 provided that any dispersion method is submersible in a liquid cooking medium. For example, the ends of tubes 1 could be bent upward to form part of the vertical intake manifold. However, it is desired that the flames of the burning gases enter tube 1 at a point close to the horizontal grill surface to maximize the grill temperature.

Figure 4:
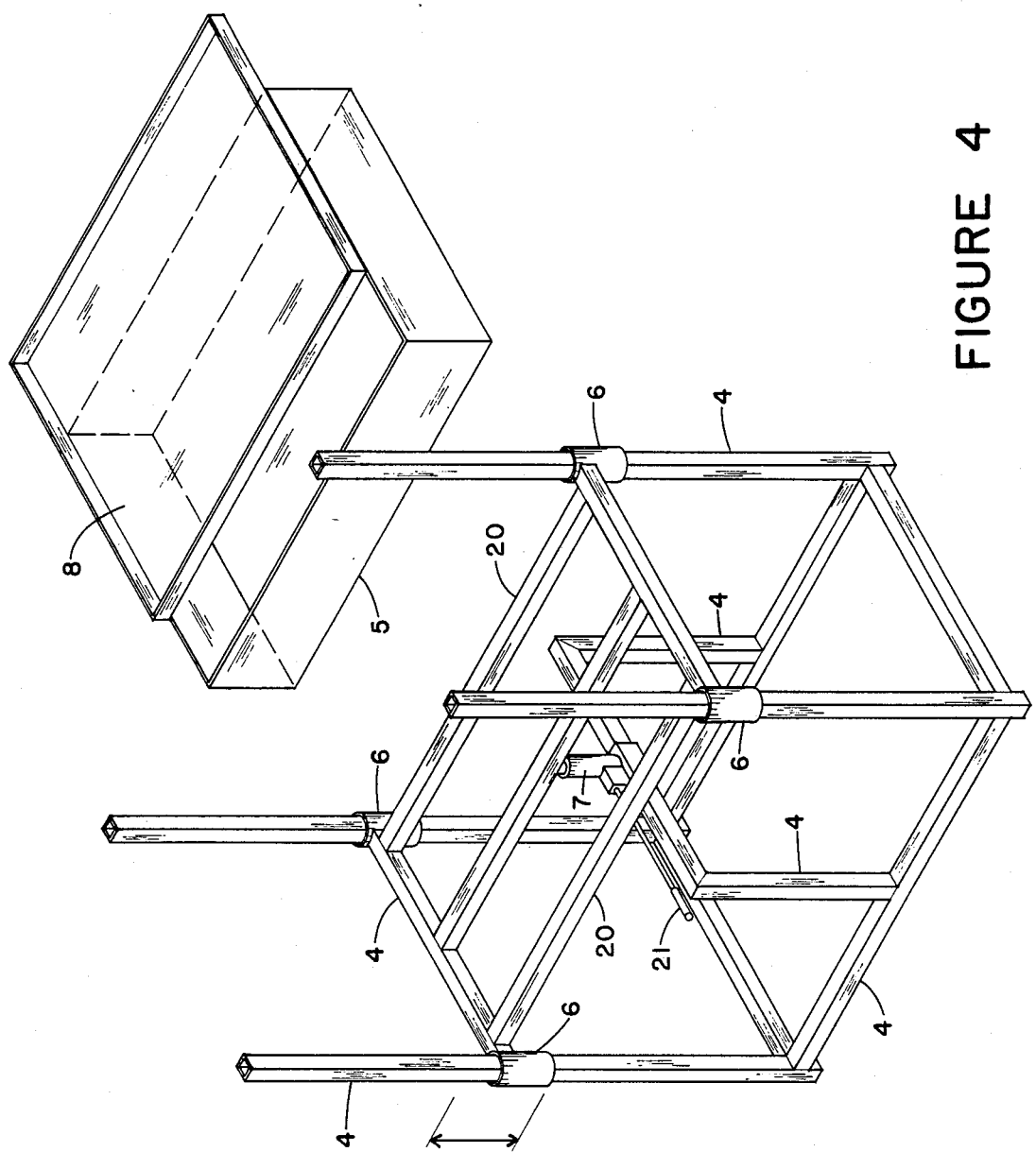
FIG. 4 is a perspective of the mechanism to submerse the tubes in the pan.

The preferred method of adjusting the vertical relationship between cooking pan 5 and tubes 1 is shown in FIG. 4. Jack 7 is secured to a cross support on frame 4 and positioned below pan support 20. Jack 7 has lever 21 which can be used to pump the hydraulic fluid in the case of a hydraulic jack. Of course, alternately, frame 4 could have an upper extension which attaches to the intake and exhaust manifolds 2 and 3, and tubes 1 could be lowered into cooking pan 5.

Figure 5:
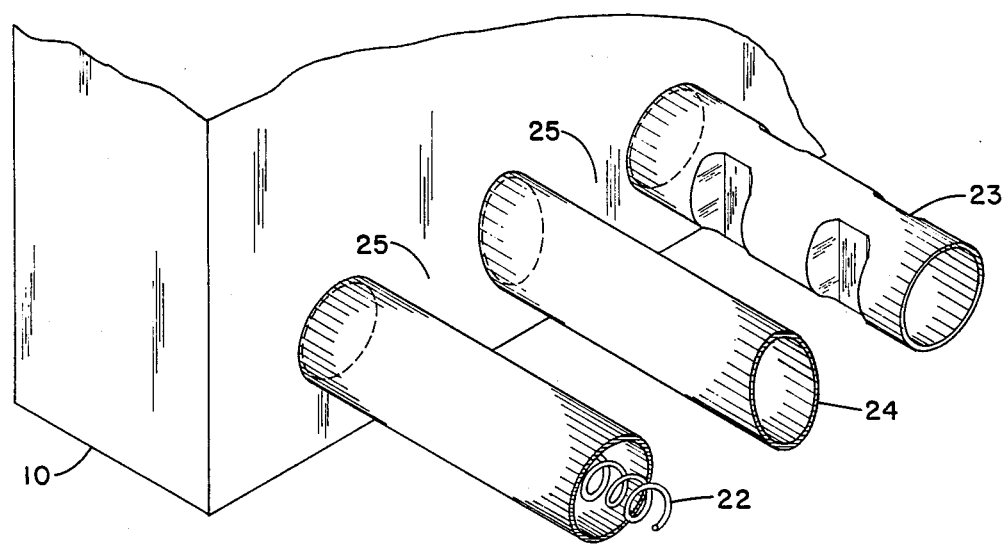
FIG. 5 is a perspective of tubes with baffles, oval shape and crimps.

In the preferred embodiment of the invention, heat transfer through tubes 1 is optimized. As shown in FIG. 5, tubes 1 can be provided with baffles 22. Baffles 22 induce turbulent flow of the combustion gases through tubes 1 thereby increasing heat transfer. Alternately, tubes 1 may be crimped to create internal notches 23 which also induce turbulent flow. Another variation in tube design is to use oval tubes 24. Oval tubes 24 are positioned vertically to compensate for the tendency of the flame at the intake end to rise and to simulate traditional grill patterns on the food. Even when oval tubes 24 are used, spacing 25 between the tube is still maintained to allow for drippings and circulation of the liquid cooking medium.

For more efficient heat transfer, smaller tubes are employed. Tubes having an outside diameter of less than ¾ of an inch and greater than ¼" are preferred. Too small of a tube diameter generates problems with introducing a flame and increases pressure drop.

There are, of course, many alternate embodiments of the invention which are intended to be included within the scope of the invention as defined by the following claims. For example, other means to heat the tubes could be employed in the combination grill and boiler/deep fryer such as steam, electricity or other fossil fuels. Gas fired tubes with a forced draft exhaust fan as disclosed herein may be used in hot water heaters or other heat transfer equipment.

What I claim is:

1. A gas fired cooking apparatus, comprising:
 (a) a plurality of parallel tubes arranged to form a horizontal plane, each of said tubes having an intake end and an exhaust end;
 (b) an intake manifold having a vertical lower end connected to said intake end of each of said tubes wherein said lower end is an intake duct;
 (c) a combustion gases dispersion head positioned within said intake duct, proximate to said intake ends of said tubes;
 (d) an exhaust manifold having a vertical lower end connected to said exhaust end of each of said tubes;
 (e) an exhaust fan connected to said exhaust manifold for drawing said combustion gases through said tubes;
 (f) an upright frame connected to an upper end of said intake manifold and an upper end of said exhaust manifold for supporting said tubes in a raised position;
 (g) a pan supported by said frame beneath and parallel to said tubes, said pan being dimensioned to accommodate said tubes therein; and
 (h) a jack supported on said frame beneath said pan for vertically adjusting said pan in relation to said tubes to immerse said tubes.

2. A gas fired combination grill and deep fryer, comprising:

(a) a plurality of parallel tubes arranged to form a horizontal plane, said tubes being in sufficient proximity to form a surface for grilling food, each of said tubes having an intake end and an exhaust end;

(b) an intake manifold connected to said intake ends of said tubes and extending vertically upward from said tubes;

(c) means to supply combustion gases to said intake manifold;

(d) an exhaust manifold connected to said exhaust ends of said tubes and extending vertically upward from said tubes;

(e) an exhaust fan connected to said exhaust manifold for drawing said combustion gases through said tubes;

(f) an upright frame connected to said intake manifold and said exhaust manifold for supporting said tubes in a raised position;

(g) a pan supported by said frame beneath and parallel to said tubes, said pan being dimensioned to accommodate said tubes therein; and (h) means to vertically adjust a relationship between said pan and said tubes whereby said tubes may be raised from or lowered into said pan.

3. A gas fired combination grill and deep fryer as in claim 2, wherein said pan is vertically adjustable on said frame.

4. A gas fired combination grill and deep fryer as in claim 2, wherein said tubes have an outside diameter of less than $\frac{3}{4}$ of an inch.

* * * * *